(12) United States Patent
Ota

(10) Patent No.: US 10,434,951 B2
(45) Date of Patent: Oct. 8, 2019

(54) DOOR APPARATUS OF A BOX

(71) Applicant: KOJIMA INDUSTRIES CORPORATION, Toyota-shi, Aichi-ken (JP)

(72) Inventor: Ko Ota, Toyota (JP)

(73) Assignee: KOJIMA INDUSTRIES CORPORATION, Toyota-shi (JP)

( * ) Notice: Subject to any disclaimer, the term of this patent is extended or adjusted under 35 U.S.C. 154(b) by 46 days.

(21) Appl. No.: 15/896,824

(22) Filed: Feb. 14, 2018

(65) Prior Publication Data

US 2018/0272955 A1    Sep. 27, 2018

(30) Foreign Application Priority Data

Feb. 17, 2017    (JP) .................... 2017-028482

(51) Int. Cl.
*B60R 7/06*    (2006.01)
(52) U.S. Cl.
CPC ..................... *B60R 7/06* (2013.01)
(58) Field of Classification Search
CPC ....................................... B60R 7/06
See application file for complete search history.

(56) References Cited

U.S. PATENT DOCUMENTS

| 7,048,311 B2* | 5/2006 | Sawatani | B60R 7/06 292/32 |
| 7,422,261 B2* | 9/2008 | Zellner, Jr. | E05B 83/30 224/483 |
| 2014/0132023 A1* | 5/2014 | Watanabe | B60R 13/0206 296/37.12 |

FOREIGN PATENT DOCUMENTS

JP    2014-094722 A    5/2014

* cited by examiner

*Primary Examiner* — Lori L Lyjak
(74) *Attorney, Agent, or Firm* — Hunton Andrews Kurth LLP

(57) ABSTRACT

A coupling includes a coupling male having an engaging head and a coupling female having an engaged beam. The engaged beam is pushed and elastically deformed by the engaging head in a direction perpendicular to an inserting direction of the coupling male into the coupling female when the engaging head is engaging the engaged beam. It is not necessary to provide a pair of slits at the coupling male for causing the engaging head to engage the engaged beam. As a result, a length of the coupling male in the inserting direction of the coupling male can be made small. As a result, a thickness of the door apparatus can be made smaller than that of a conventional door apparatus.

5 Claims, 19 Drawing Sheets

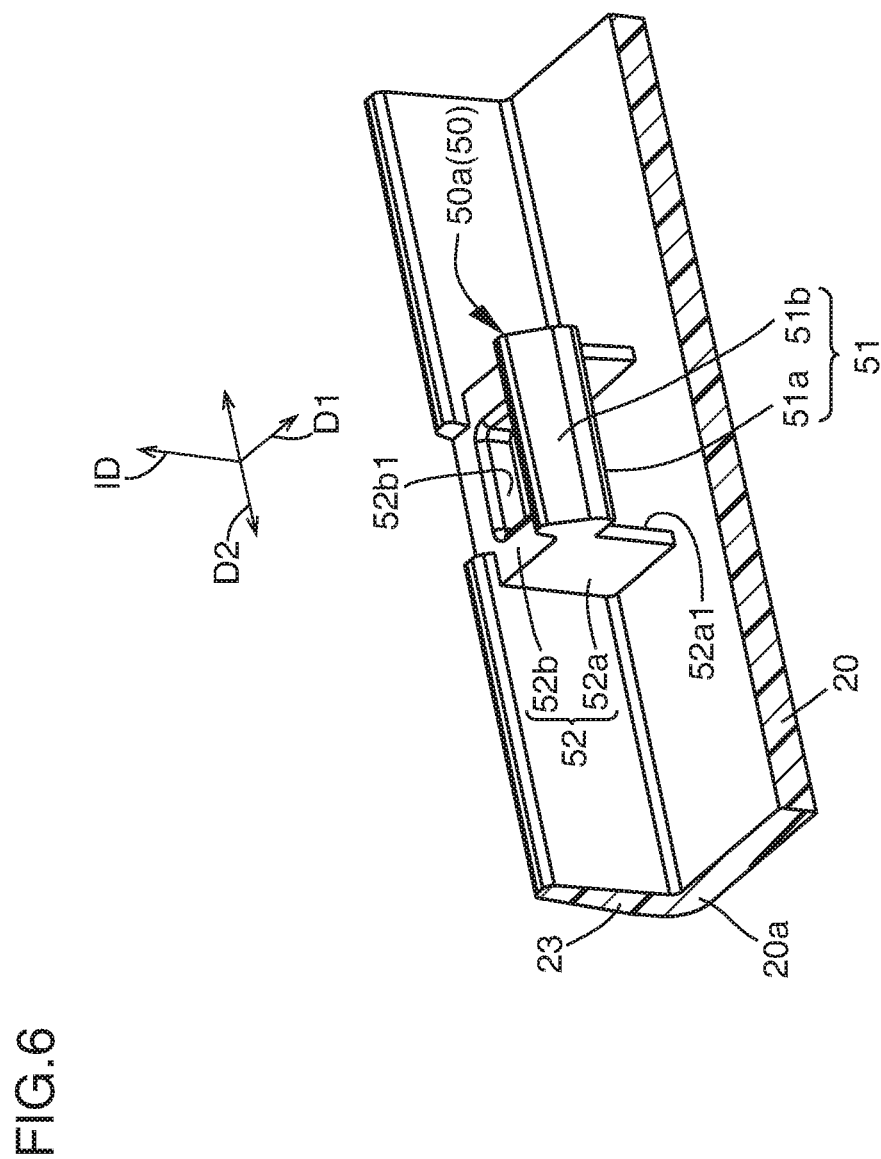

DOOR APPARATUS OF A BOX

CROSS-REFERENCE TO RELATED APPLICATION

The present application claims priority to Japanese Patent Application No. 2017-028482 filed on Feb. 17, 2017, which is incorporated herein by reference in its entirety.

TECHNICAL FIELD

The present invention relates to a door apparatus of a box, for example, a door apparatus of a glove box of a vehicle.

BACKGROUND

Japanese Patent Publication 2014-94722 discloses a door apparatus of a box. As illustrated in FIG. 22, the door apparatus has a coupling male 4 provided at an inner panel 2 and a coupling female 5 provided at an outer panel 3. The coupling male 4 is of a cantilever type. The coupling male 4 includes an engaging head 4a for engaging the coupling female 5 and a head support 4b supporting the head 4a. The engaging head 4a and the head support 4b are separated from a remaining portion of the coupling male 4 by a slit 4c except at a root of the head support 4b. The slit 4c has a pair of slit portions each extending in an inserting direction (a direction shown by an arrow in FIG. 22) of the coupling male 4 at opposite width-sides of the engaging head 4a and the head support 4b. Since the slit portions of the slit 4c extend in the inserting direction of the coupling male 4, the head support 4b of the coupling male 4 can be elastically deformed in a direction perpendicular to the inserting direction of the coupling male 4 when the coupling male 4 is inserted into a hole of the coupling female 5. After the engaging head 4a has passed the hole, the head support 4b elastically returns to its original, non-deformed position and the engaging head 4a of the coupling male 4 engages a portion of the coupling female 5 defining the hole.

However, there are the following problems with the conventional door apparatus of a box disclosed above:
Since the coupling male 4 includes the pair of slits 4c each extending in the inserting direction of the coupling male 4 into the coupling female 5, a length of the coupling male 4 in the inserting direction of the coupling male 4 is relatively large. As a result, a space of the door apparatus required for disposing the coupling male 4 is relatively large so that a thickness of the door apparatus is likely to be large.

Patent Document

Patent Document 1: JP2014-94722

BRIEF SUMMARY

An object of an embodiment of the invention is to provide a door apparatus of a box where a thickness of which can be made small.

Solutions

In order to achieve the above-described object, embodiments of the present invention can include the following aspects:
(1) A door apparatus of a box according to a first aspect of an embodiment of the invention comprises an inner panel, an outer panel and a coupling having a coupling male formed at the inner panel and a coupling female formed at the outer panel.
The coupling male includes an engaging head.
The coupling female includes an engaged beam which the engaging head engages.
When the coupling male is inserted into the coupling female, the engaging head engages the engaged beam, whereby the inner panel and the outer panel are coupled with each other so as to be non-removable from each other.
The engaged beam is elastically deformable in a first direction (D1) perpendicular to an inserting direction (ID) of the coupling male into the coupling female, owing to a structure that the engaged beam extends in a second direction (D2) perpendicular to the inserting direction (ID) of the coupling male and the first direction (D2). The engaged beam is elastically deformed in the first direction (D1) away from the engaging head by being pushed by the engaging head when the coupling male is inserted into the coupling female, and the engaged beam elastically returns to its original, non-deformed position to engage the engaging head when the engaging head has passed the engaged beam.
The coupling male includes an opening penetrating the coupling male in the inserting direction (ID) of the coupling male.
The coupling female includes an extending portion extending from the outer panel toward the inner panel through the opening.
The extending portion includes a bulged portion bulging in the first direction.
The bulged portion includes an inclined surface inclined such that a bulging amount of the bulged portion is increased in a direction opposite the inserting direction of the coupling male. The inclined surface engages a cross-sectional corner of an edge of the coupling male defining the opening when the engaging head has engaged the engaged beam.
(2) According to a second aspect, in the first aspect, the coupling female includes a stopper restricting the coupling male to further move relative to the coupling female in the inserting direction of the coupling male when the coupling male contacts the stopper.
(3) According to a third aspect, in the first aspect, the coupling female includes a pair of beam supports opposing each other in the second direction and supporting the engaged beam.
The coupling male includes a head support and a rib. The head support supports the engaging head and is located between the pair of beam supports when the engaging head has engaged the engaged beam. The rib protrudes from the head support in an opposing direction of the pair of beam supports.
(4) According to a fourth aspect, in the first aspect, the inner panel includes a flange disposed at a periphery of the inner panel and extending toward the outer panel. The outer panel includes a flange-holding portion which holds the flange of the inner panel when the flange of the inner panel is inserted into the flange-holding portion.
(5) According to fifth aspect, in the first aspect, the door apparatus of a box is a door apparatus of a glove box of a vehicle.

According to the first aspect, since the engaged beam can be deformed in the first direction perpendicular to the inserting direction of the coupling male when the engaging head is caused to engage the engaged beam, it is not necessary to provide a pair of slits at the coupling male in order to cause the engaging head to engage the engaged beam. As a result, a length of the coupling male in the inserting direction of the coupling male can be shorter than that of the conventional door apparatus where the pair of slits are provided at the coupling male. As a result, the thickness of the door apparatus can be thinner than that of the conventional door apparatus.

Further, since the bulged portion provided at the extending portion of the coupling female includes the inclined surface contacting the cross-sectional corner of the edge of the coupling male defining the opening, a force can be imposed on the coupling male to bias the coupling male in the inserting direction of the coupling male. Therefore, the coupling male can be suppressed from moving relative to the coupling female in the direction opposite the inserting direction of the coupling male.

According to the second aspect, since the coupling female includes the stopper, when the coupling male contacts the stopper, the coupling male can be suppressed from further moving relative to the coupling female in the inserting direction of the coupling male. Therefore, an engaging state of the coupling male with the coupling female can be stably maintained.

According to the third aspect, the coupling female includes the pair of beam supports and the coupling male includes the head support and the rib. The head support is located between the pair of beam supports, and the rib protrudes from the head support in the opposing direction of the pair of beam supports. Owing to this arrangement including the rib, the head support of the coupling male is restricted from moving relative to the coupling female in the opposing direction of the pair of beam supports. As a result, the coupling male is suppressed from moving relative to the coupling female in the opposing direction of the pair of beam supports.

According to the fourth aspect, since the inner panel includes the flange provided at the periphery of the inner panel and extending toward the outer panel and the outer panel includes the flange-holding portion which the flange of the inner panel is inserted into and held by, the inner panel and the outer panel can be suppressed from moving relative to each other.

According to the fifth aspect, even in the case where the door apparatus of a box is the door apparatus of a glove box for a vehicle, the same technical advantages as those obtained in the door apparatus of a box according to the first aspect can be obtained.

BRIEF DESCRIPTION OF THE DRAWINGS

FIG. 6 is an enlarged, partial perspective view of the inner panel and a coupling male of the door apparatus of a box according to the embodiment of the present invention.

FIG. 7(a) illustrates a state just before the coupling male is inserted into the coupling female, FIG. 7(b) illustrates a state where the coupling male is being inserted into the coupling female, and FIG. 7(c) illustrates a state where the coupling male has been inserted into the coupling female.

FIG. 8(a) illustrates a state just before the coupling male is inserted into the coupling female, FIG. 8(b) illustrates a state where the coupling male is being inserted into the coupling female, and FIG. 8(c) illustrates a state where the coupling male has been inserted into the coupling female.

DETAILED DESCRIPTION

A door apparatus of a box (hereinafter, merely, "a door apparatus") according to the present invention will be explained below with reference to FIGS. 1-21.

Figure 1:
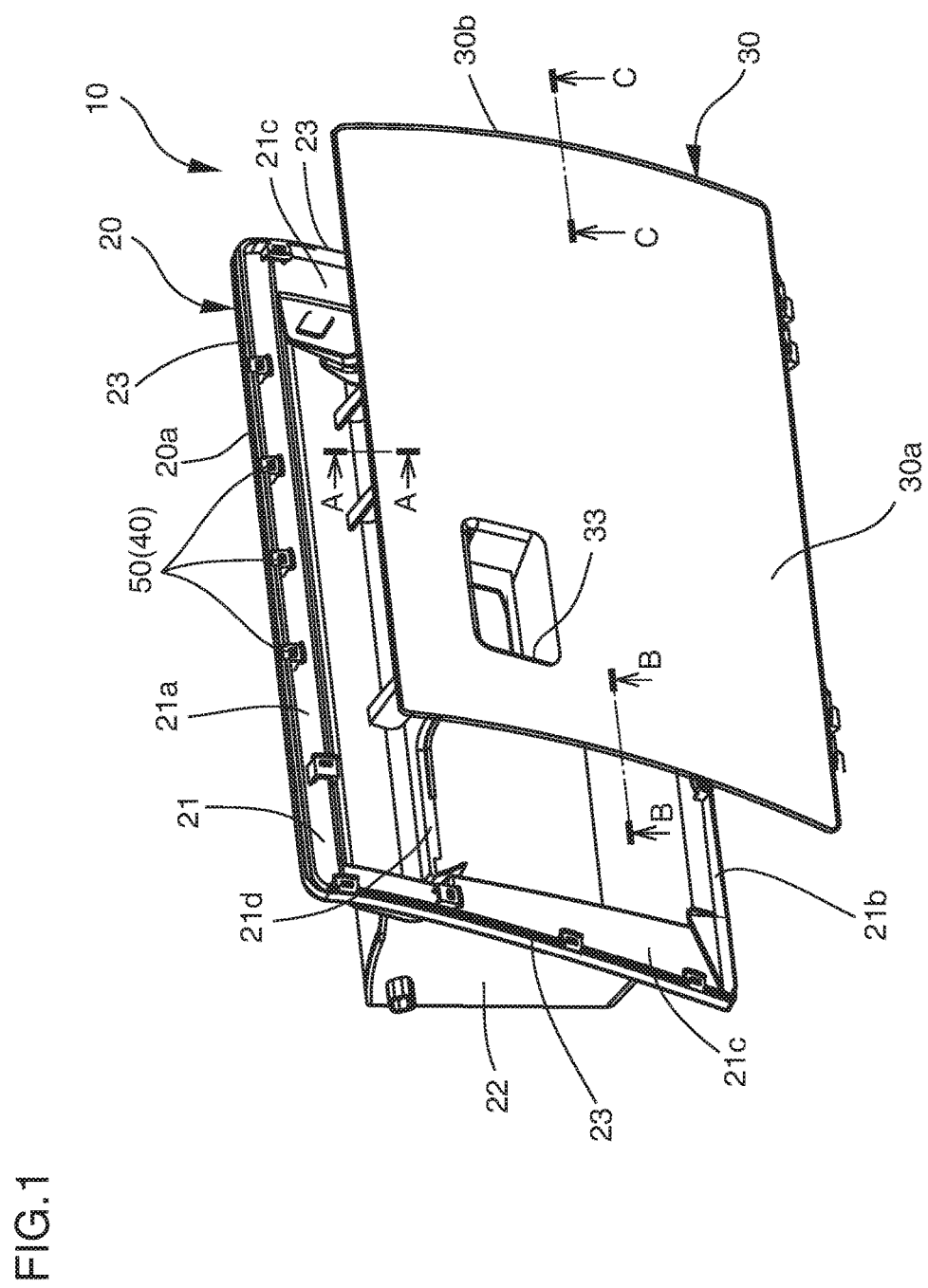
FIG. 1 is a perspective view in a disassembly state of parts of a door apparatus of a box according to an embodiment of the present invention.
Figure 2:
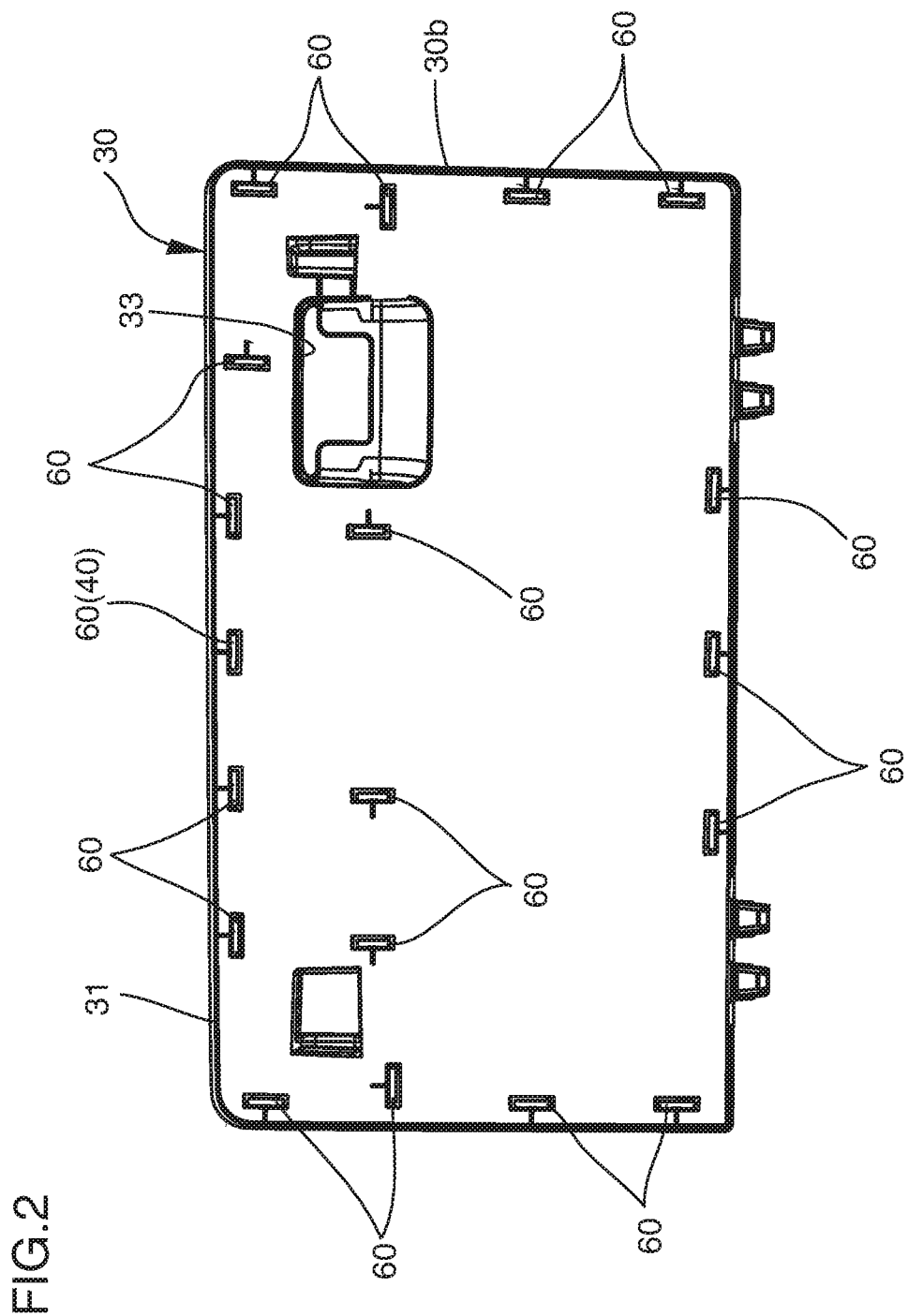
FIG. 2 is a rear view of an outer panel of the door apparatus of a box according to the embodiment of the present invention.

As illustrated in FIG. 1, a door apparatus 10 according to an embodiment of the present invention may be a door apparatus of, for example, a glove box disposed at an instrument panel in front of a front passenger seat of a vehicle, though not limited to that. The door apparatus 10 may be a door apparatus of an upper box disposed above the glove box, a door apparatus of a console box disposed between a driver seat and the front passenger seat of the vehicle, or a door apparatus of other boxes. In a description below, the door apparatus 10 of the glove box of a vehicle will be taken as an example.

The door apparatus 10 is rotatably coupled to the instrument panel. The door apparatus 10 can be opened and closed relative to the instrument panel. When a lock device (not shown) is unlocked, the door apparatus 10 can be rotated to open about a rotational axis located at a lower end or a lower portion of the door apparatus in a direction from a closed position to an open position by a weight of the door apparatus itself. When rotating (closing) the door apparatus 10 from the open position to the closed position about the rotational axis, the door apparatus 10 is raised up manually. When the lock device is locked while the door apparatus 10 is at the closed position, the door apparatus 10 can keep its closed position.

The door apparatus 10 includes an inner panel 20, an outer panel, 30 and a coupling 40. The coupling 40 has a coupling male 50 formed at the inner panel 20 and a coupling female 60 formed at the outer panel 30.

The inner panel 20 may be made from resin. The inner panel 20 includes a frame 21 and a flange 23 of the inner panel provided at a periphery 20a of the inner panel 20. The inner panel 20 may include a housing portion 22 protruding from the frame 21 in a direction opposite the outer panel 30. The housing portion 22 may be provided not at the inner panel 20 but at the instrument panel.

Figure 3:
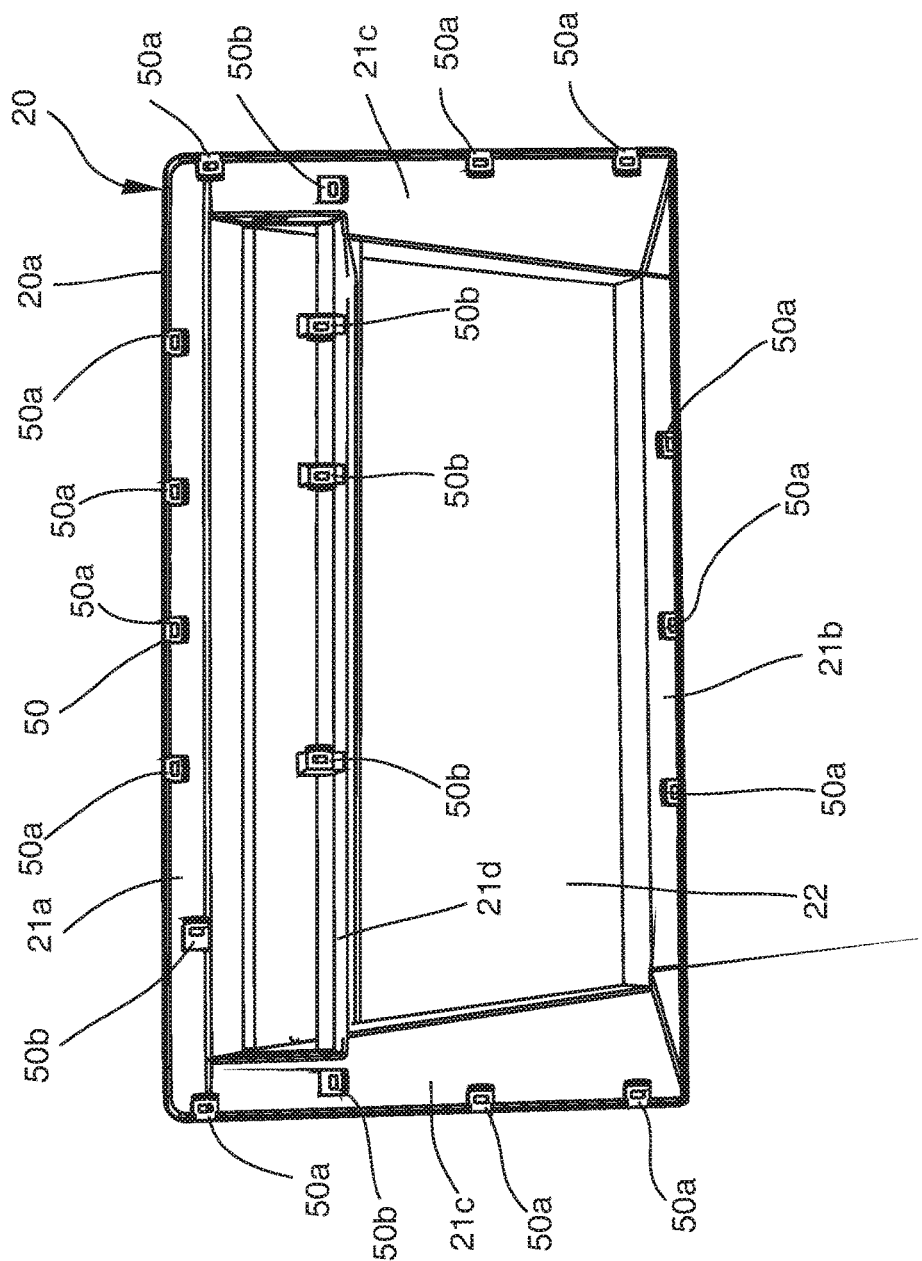
FIG. 3 is a front view of an inner panel of the door apparatus of a box according to the embodiment of the present invention.

As illustrated in FIG. 3, the frame 21 includes an upper frame 21a, a lower frame 21b and a pair of side frames 21c connecting the upper frame 21a and the lower frame 21b. The frame 21 further includes an intermediate frame 21d located between the upper frame 21a and the lower frame 21b and connecting the pair of side frames 21c. As illustrated in FIG. 1, the housing portion 22 for housing some goods therein opens upward.

The flange 23 of the inner panel extends from the periphery 20a of the inner panel 20 toward the outer panel 30. The flange 23 of the inner panel may be provided continuously over the entire circumference of the periphery 20a of the inner panel 20 or may be provided continuously at a portion of the periphery 20a of the inner panel 20. In the case where the flange 23 of the inner panel is provided continuously at a portion of the periphery 20a of the inner panel 20, the flange 23 of the inner panel is provided at the upper frame 21a and the pair of side frames 21c, 21c.

Figure 12:
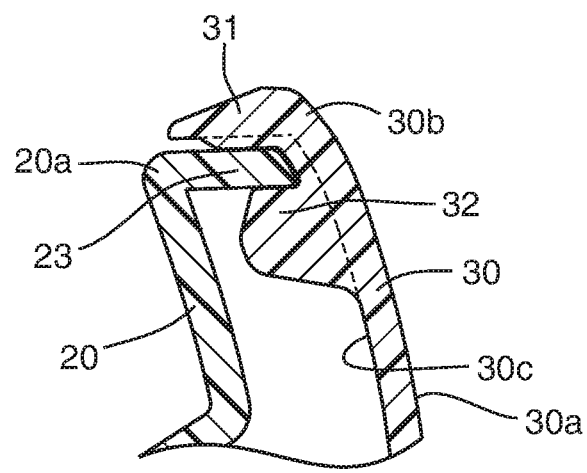
FIG. 12 is an enlarged cross-sectional view taken along line A-A of FIG. 1 of the door apparatus of a box according to the embodiment of the present invention.
Figure 13:
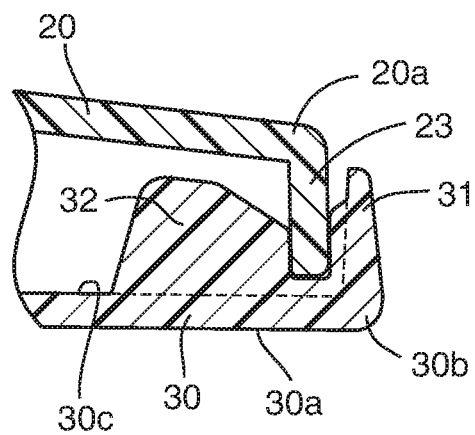
FIG. 13 is an enlarged cross-sectional view taken along line B-B of FIG. 1 of the door apparatus of a box according to the embodiment of the present invention.
Figure 14:
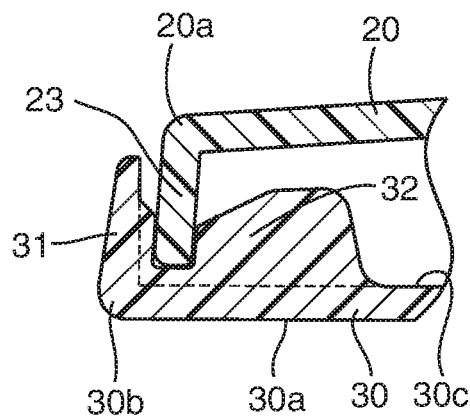
FIG. 14 is an enlarged cross-sectional view taken along line C-C of FIG. 1 of the door apparatus of a box according to the embodiment of the present invention.

The outer panel 30 is made from resin. The outer panel 30 is disposed on a passenger room-side of the inner panel 20. The outer panel 30 covers the inner panel 20 from a passenger room-side. A passenger room-side surface 30a of the outer panel 30 defines a design surface. An opening 33 for disposing an operating knob (not shown) is formed at the outer panel 30. As illustrated in FIGS. 12-14, the outer panel 30 includes a flange 31 of the outer panel provided at a periphery 30b of the outer panel 30 and a flange-holding portion 32.

The flange 31 of the outer panel 30 extends from the periphery 30b of the outer panel 30 toward the inner panel 20. The flange 31 of the outer panel 30 may be provided continuously over the entire circumference of the periphery 30b of the outer panel 30 or may be provided continuously at a portion of the periphery 30b of the outer panel 30. In the case where the flange 31 of the outer panel 30 is provided continuously at a portion of the periphery 30b of the outer panel 30, the flange 31 of the outer panel is provided at an upper end and the pair of side ends of the outer panel 30. The flange 31 of the outer panel 30 is located outside the flange 23 of the inner panel 20.

The flange-holding portion 32 is provided for suppressing the inner panel 20 and the outer panel 30 from moving relative to each other. The flange-holding portion 32 is provided at a surface (a back surface) 30c opposite the passenger room-side surface of the outer panel 30. The flange 23 of the inner panel 20 is inserted into the flange-holding portion 32 with no clearance. Therefore, the flange 23 of the inner panel 20 is held by the flange-holding portion 32. It is preferable that the flange 23 of the inner panel 20 is held by the flange-holding portion 32 over the entirety of the flange 23 of the inner panel 20 in a longitudinal direction of the flange 23 of the inner panel 20. For increasing the rigidity of the outer panel 30, it is preferable that the flange-holding portion 32 is connected to not only the back surface 30c of the outer panel 30 but also the flange 31 of the outer panel 30.

Figure 18:
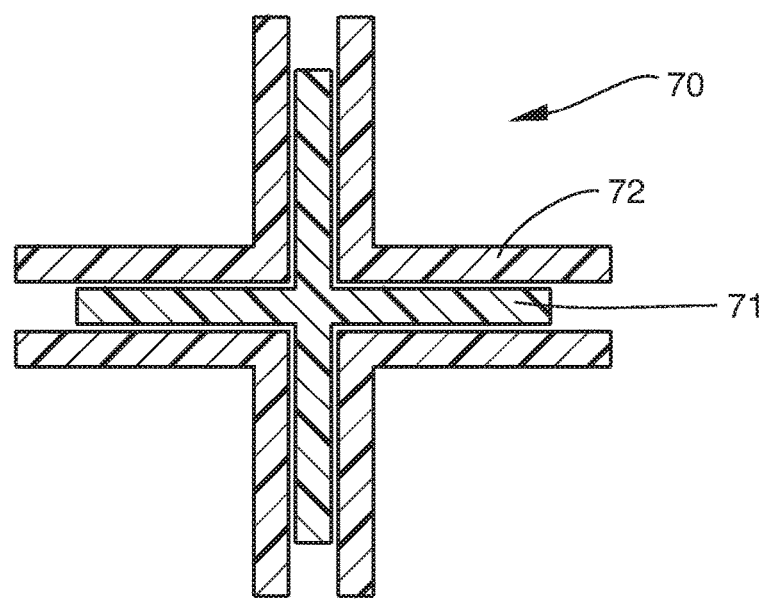
FIG. 18 is a cross-sectional view of a dislocation-preventing structure for preventing the inner panel and the outer panel from moving relative to each other, of the door apparatus of a box according to the embodiment of the present invention.

As illustrated in FIG. 18, the door apparatus 10 may further include a dislocation-preventing structure 70 for suppressing the inner panel 20 and the outer panel 30 from being dislocated (moving) relative to each other. The dislocation-preventing structure 70 includes a cross-shaped male 71 and a cross-shaped female 72 into which the cross-shaped male 71 is inserted. The cross-shaped male 71 is formed integrally at one of the inner panel 20 and the outer panel 30 and the cross-shaped female 72 is formed integrally at the other of the inner panel 20 and the outer panel 30. The cross-shaped male 71 is supported by the cross-shaped female 72 so as not to cause rattling.

Figure 4:
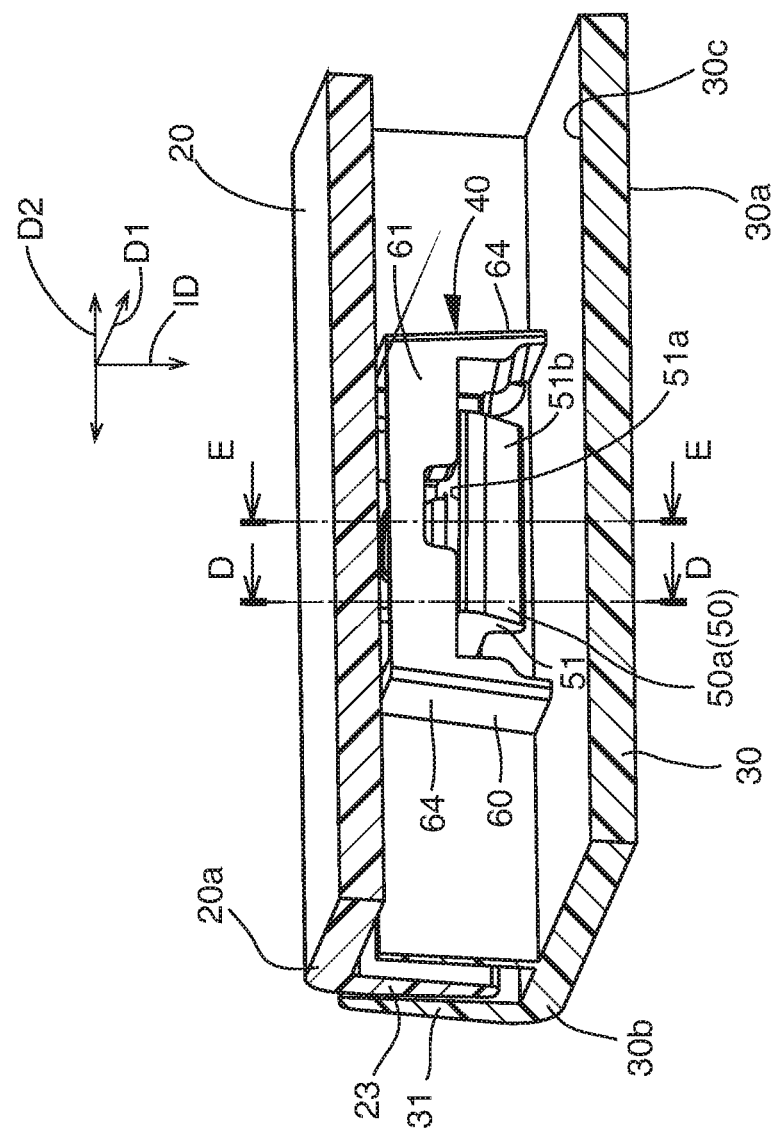
FIG. 4 is an enlarged, partial perspective view of a coupling and its vicinity of the door apparatus of a box according to the embodiment of the present invention.

A plurality of couplings 40 are provided. As illustrated in FIG. 4, each of the plurality of couplings 40 includes a coupling male 50 having an engaging head 51 and a coupling female 60 having an engaged beam 61. The engaged beam 61 is elastically deformable in a first direction D1 perpendicular to an inserting direction ID of the coupling male 50 into the coupling female 51 (hereinafter, merely, "an inserting direction ID of the coupling male 51" or "an inserting direction ID"). The coupling male 50 is provided at the inner panel 20 among the inner panel 20 and the outer panel 30. The coupling female 60 is provided at the outer panel 30 among the inner panel 20 and the outer panel 30. The coupling male 50 is inserted into the coupling female 60 and the engaging head 51 engages the engaged beam 61 whereby the inner panel 20 and the outer panel 30 are coupled to each other in a state that the inner panel 20 and the outer panel 30 are not removable from each other.

Figure 11:
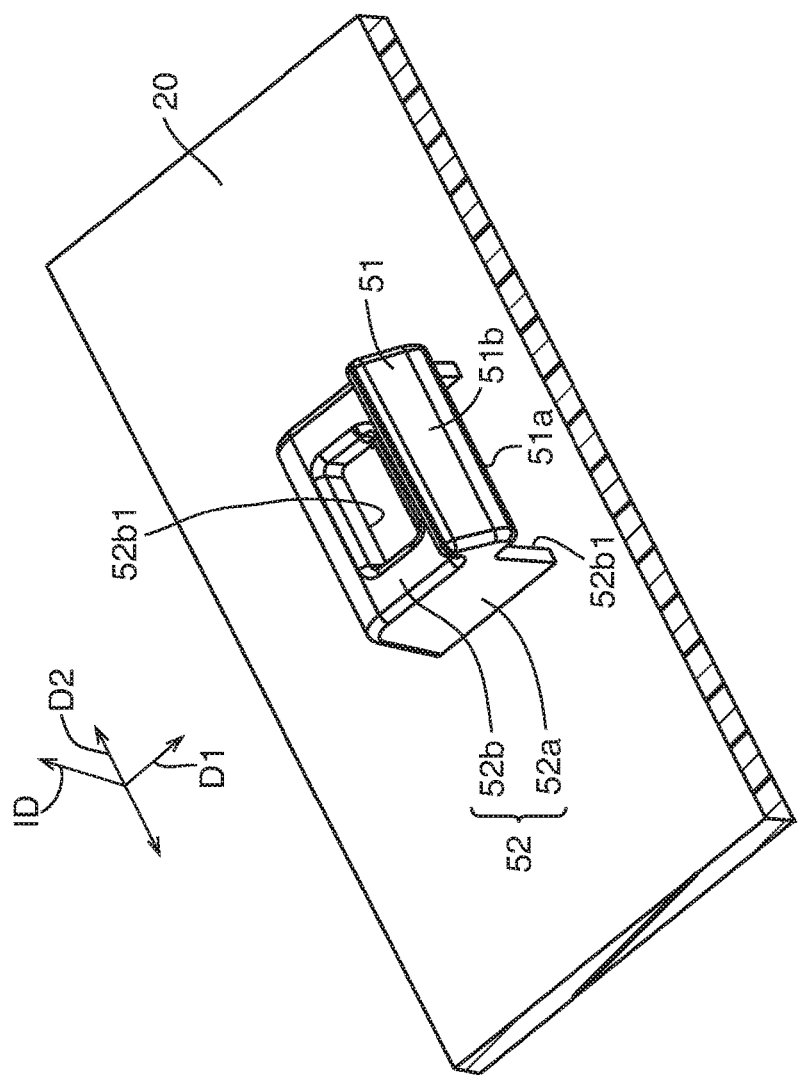
FIG. 11 is a partial, enlarged perspective view of the inner panel and the coupling male of the door apparatus of a box according to the embodiment of the present invention, where the coupling is provided at the intermediate portion of the door apparatus.

The coupling male 50 may be made from resin. The coupling male 50 is formed integral with the inner panel 20. The coupling male 50 protrudes from the inner panel 20 toward the outer panel 30. As illustrated in FIG. 3, the coupling male 50 is provided at the frame 21 of the inner panel 20. The coupling male 50 is provided at the upper frame 21a, the lower frame 21b, the side frames 21c and the intermediate frame 21d. As illustrated in FIG. 6, a first coupling male 50a located close to the flange 23 of the inner panel 20 may be connected to the flange 23 of the inner panel 20. As illustrated in FIG. 11, a second coupling male 50b located far from the flange 23 of the inner panel 20 is not connected to the flange 23 of the inner panel 20.

As illustrated in FIG. 6, the coupling male 50 includes the engaging head 51 and a head support 52.

Figure 7A:
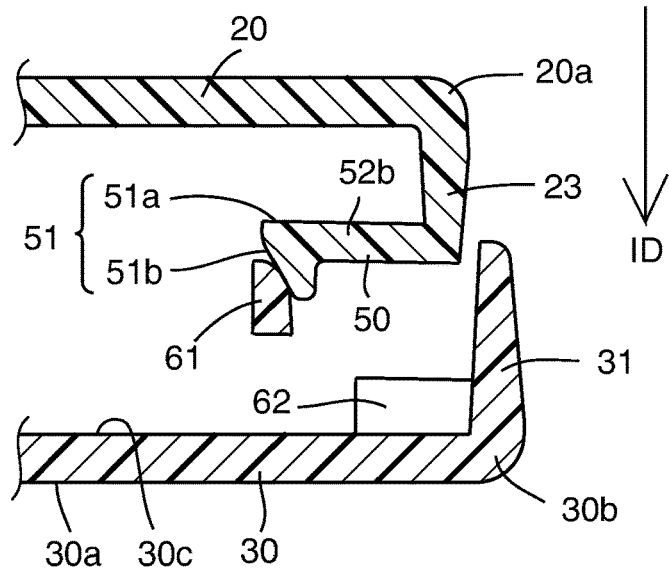
FIGS. 7(a)-7(c) is an enlarged cross-sectional view taken along line D-D of FIG. 4 of the door apparatus of a box according to the embodiment of the present invention, where
Figure 7B:
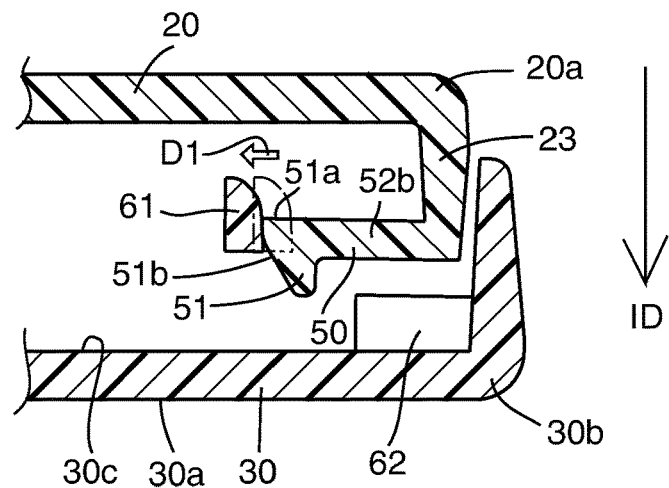
Figure 7C:
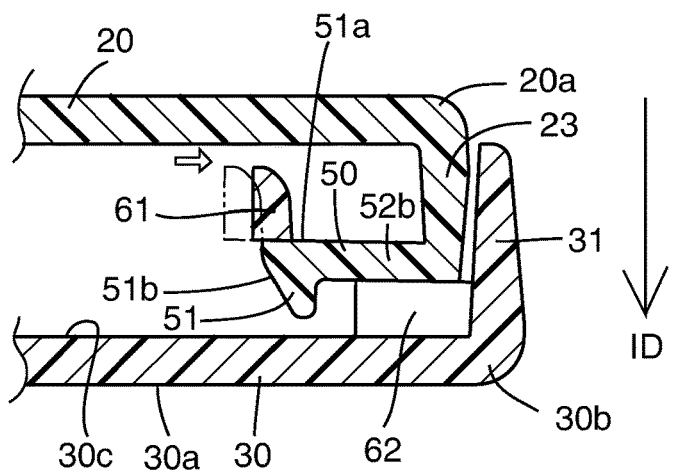

The engaging head 51 includes an engaging surface 51a which is perpendicular to the inserting direction ID and an inclined surface 51b which is inclined relative to the inserting direction ID. When the coupling male 50 is coupled to the coupling female 60, the engaging surface 51a of the engaging head 51 contacts the engaged beam 61 of the coupling female 60 thereby preventing the engaging head 51 of the coupling male 50 from being removed from the engaged beam 61 of the coupling female 60. As illustrated in FIGS. 7(a)-7(c), the inclined surface 51b slidably contacts the engaged beam 61 when the coupling male 50 is being inserted into the coupling female 60 and when the engaging head 51 is engaging the engaged beam 61 of the coupling female 60, whereby the engaging head 51 causes the engaged beam 61 to be elastically deformed in a first direction D1 perpendicular to the inserting direction ID and away from the engaging head 51 as illustrated in FIG. 7(b).

As illustrated in FIG. 6, the head support 52 is connected to the inner panel 20 and supports the engaging head 51. The head support 52 includes a side wall 52a and a connecting wall 52b. The side wall 52a rises from the inner panel 20 in the inserting direction ID. The connecting wall 52b is connected to the side wall 52a and extends from the side wall 52a in a direction perpendicular to the inserting direction ID. In an embodiment of FIG. 6, the side wall 52a is located at each of opposite ends of the engaging head 51 and is parallel to the first direction D1, and the connecting wall 52b is perpendicular to the inserting direction ID. In an embodiment of FIG. 15, the side wall 52a extends in a second direction D2 perpendicular to the inserting direction ID and to the first direction D1, and the connecting wall 52b is perpendicular to the inserting direction ID.

Figure 15:
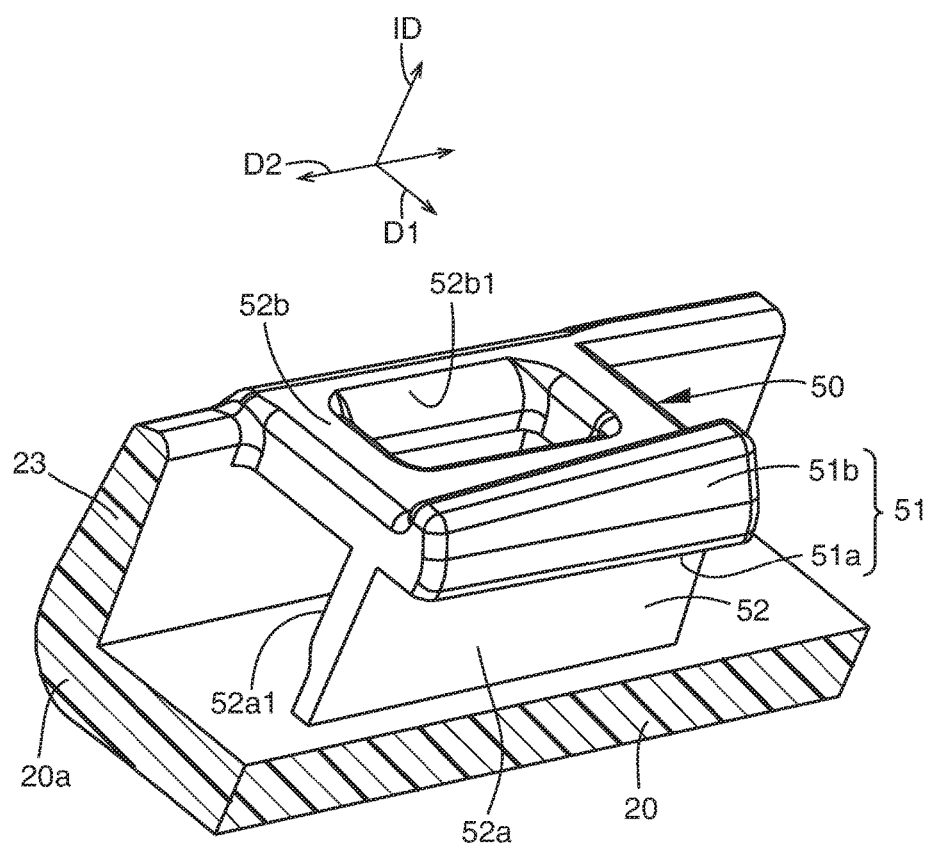
FIG. 15 is a partial, enlarged perspective view of the inner panel and the coupling male of the door apparatus of a box according to a first alteration of the present invention.

An opening 52a1 is provided at the side wall 52a for enabling to draw out a slide core (not shown) during molding from the coupling male 50 in a direction perpendicular to the inserting direction ID. In the embodiment of FIG. 6, the opening 52a1 directed in the first direction D1 is provided between the side wall 52a and on a rear side of the engaging head 51 in the inserting direction ID. In the embodiment of FIG. 15, the opening 52a1 directed in the second direction D2 is provided between the side wall 52a and the flange 23 of the inner panel 20 and extends along the engaging head 51 and in the second direction D2.

Another opening 52b1 is provided at the connecting wall 52b. The opening 52b1 penetrates the connecting wall 52b in the inserting direction ID.

The head support 52 may be connected to the engaging head 51 at the side wall 52a. The head support 52 may be connected to the engaging head 51 at the connecting wall 52b. The head support 52 may be connected to the engaging head 51 at the side wall 52a and the connecting wall 52b.

Figure 5:
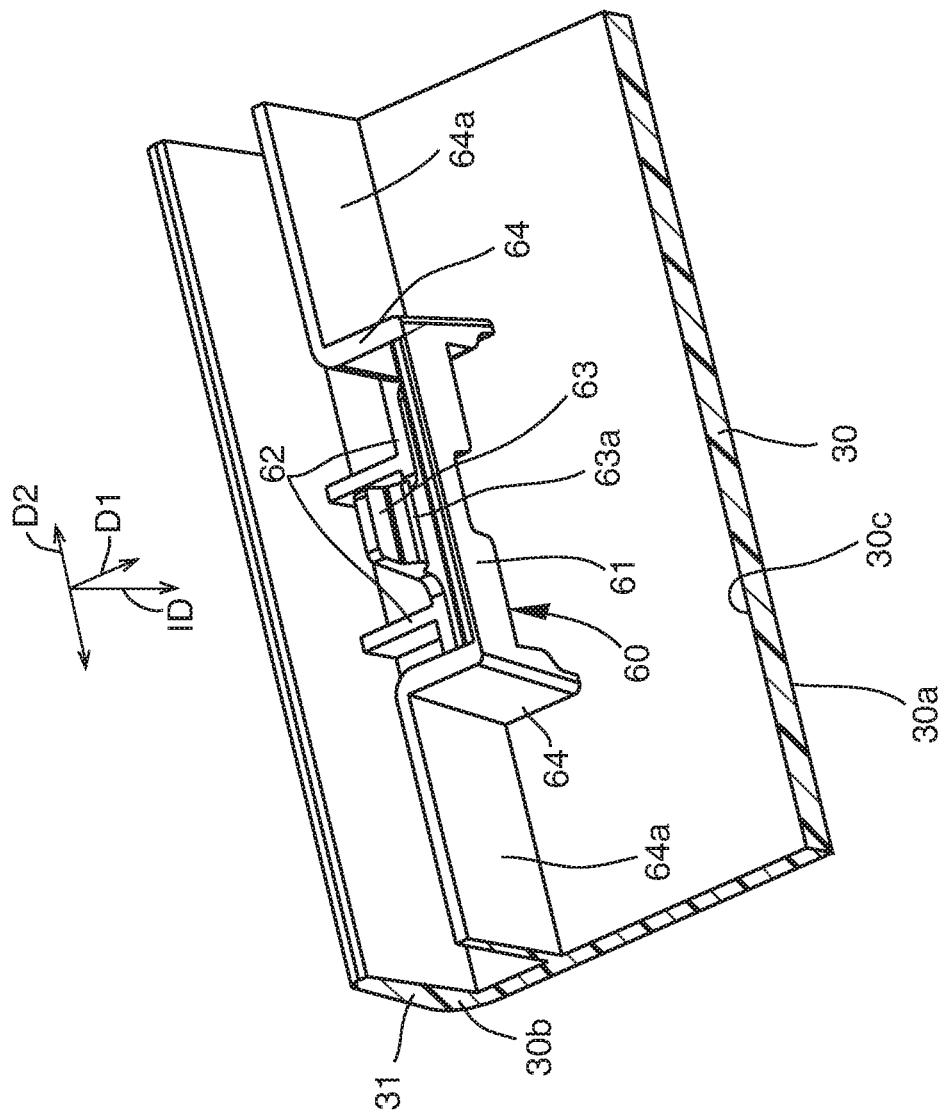
FIG. 5 is an enlarged, partial perspective view of the outer panel and a coupling female of the door apparatus of a box according to the embodiment of the present invention.

The coupling female 60 may be made from resin. As illustrated in FIG. 5, the coupling female 60 is formed integral with the outer panel 30. The coupling female 60 protrudes from a back surface (a surface opposing the inner panel) 30c of the outer panel 30 toward the inner panel 20. The coupling female 60 includes the engaged beam 61, a stopper 62, an extending portion 63 (a portion extending from the outer panel 30 toward the inner panel 20) and a pair of beam supports 64.

The engaged beam 61 is supported by the pair of beam supports 64 at opposite ends of the engaged beam 61. The engaged beam 61 connects the pair of beam supports 64 via the engaged beam 61. The engaged beam 61 is spaced away from the back surface 30c of the outer panel 30. As illustrated in FIGS. 7(a)-7(c), when the coupling male 50 is being inserted into the coupling female 60 and the engaging head 51 begins to engage the engaged beam 61, the engaged beam 61 is pushed by the engaging head 51 and is elastically deformed in the first direction D1 perpendicular to the inserting direction ID. When the engaging head 51 has passed the engaged beam 61 in the inserting direction ID, the engaged beam 61 returns to its original position due to its elasticity in a direction opposite the first direction D1, so that the engaging surface 51a of the engaging head 51 is brought into engagement with a surface of the engaged beam 61 opposing the engaging surface 51a of the engaging head 51 in the inserting direction ID whereby the coupling male 50 and the coupling female 60 are non-removably coupled with each other. Since the engaged beam 61 is elastically deformed in the first direction D1, the engaging head 51 can be brought into engagement with the engaged beam 61 by only moving the engaging head 51 in the inserting direction ID relative to the engaged beam 61.

The stopper 62 protrudes from the back surface 30c of the outer panel 30 toward the inner panel 20. As illustrated in FIG. 6, a height (i.e., a protruding length) of the stopper 62 from the back surface 30c of the outer panel 30 is smaller than a height of the pair of beam supports 64 from the back surface 30c of the outer panel 30. As illustrated in FIG. 7(c), in a state where the engaging head 51 has engaged the engaged beam 61, the connecting wall 52b of the coupling male 50 contacts the stopper 62 in the inserting direction ID, whereby the coupling male 50 is restricted to move relative to the coupling female 60 to a deeper position in the inserting direction ID. As illustrated in FIG. 5, the stopper 62 may be connected to the pair of beam supports 64.

Figure 8A:
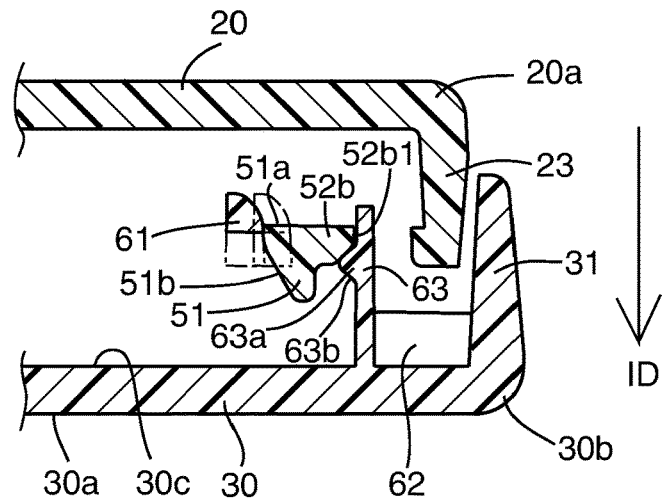
FIGS. 8(a)-8(c) is an enlarged cross-sectional view taken along line E-E of FIG. 4 of the door apparatus of a box according to the embodiment of the present invention, where
Figure 8B:
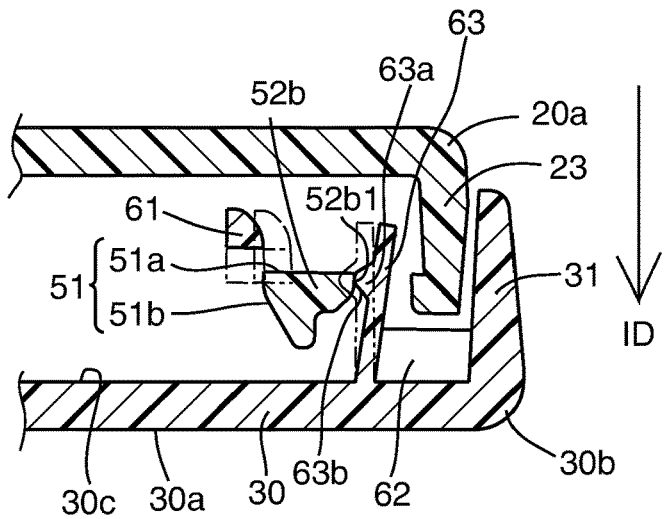
Figure 8C:
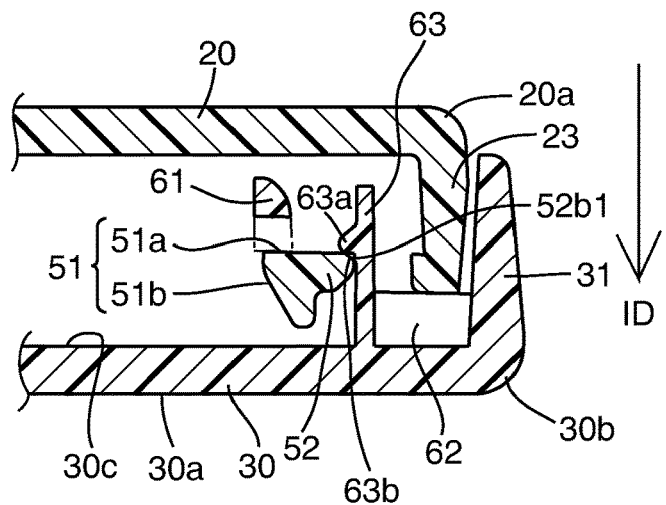
Figure 9:
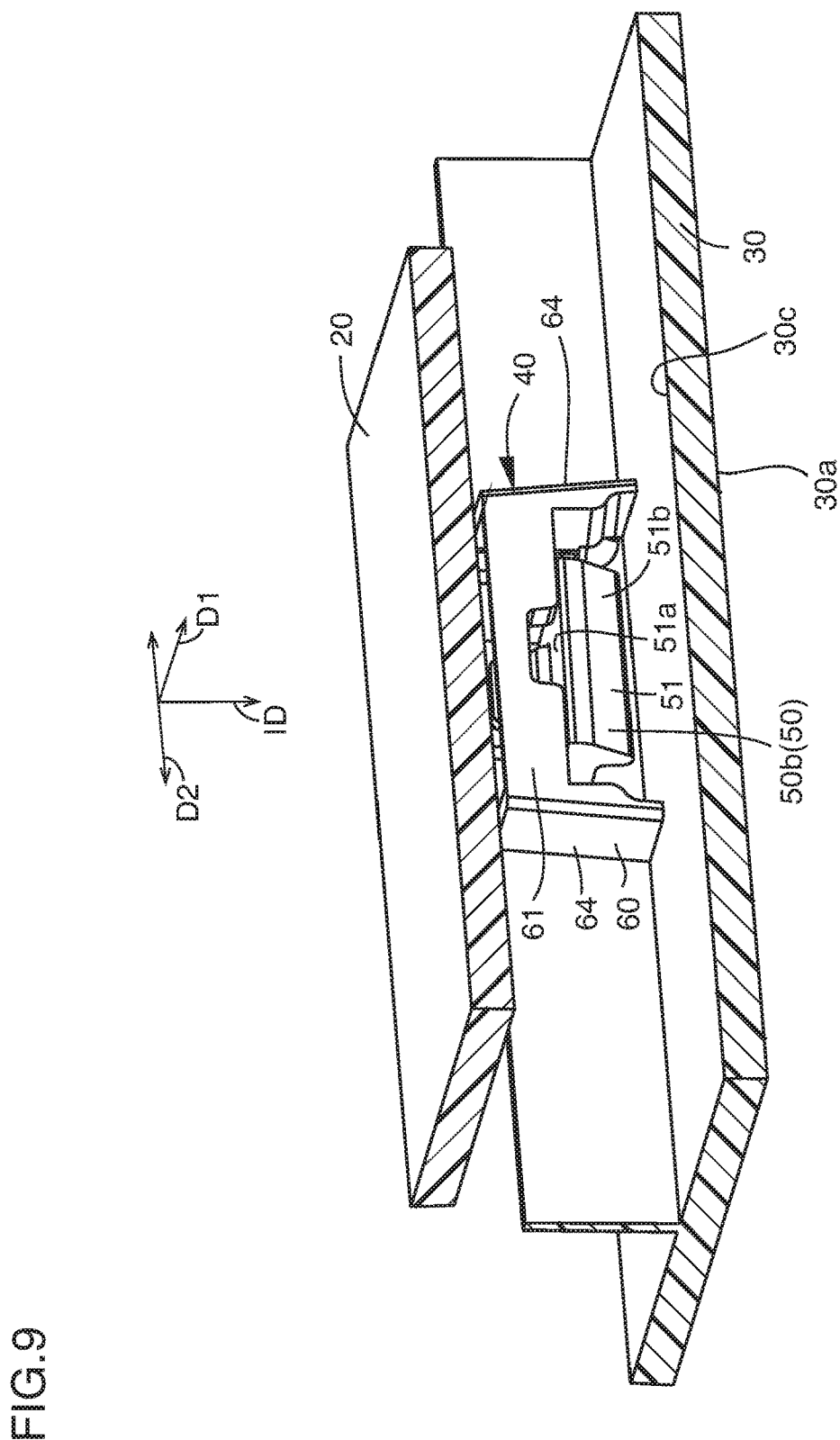
FIG. 9 is a partial, enlarged perspective view of the coupling and its vicinity of the door apparatus of a box according to the embodiment of the present invention, where the coupling is provided at an intermediate portion of the door apparatus.
Figure 10:
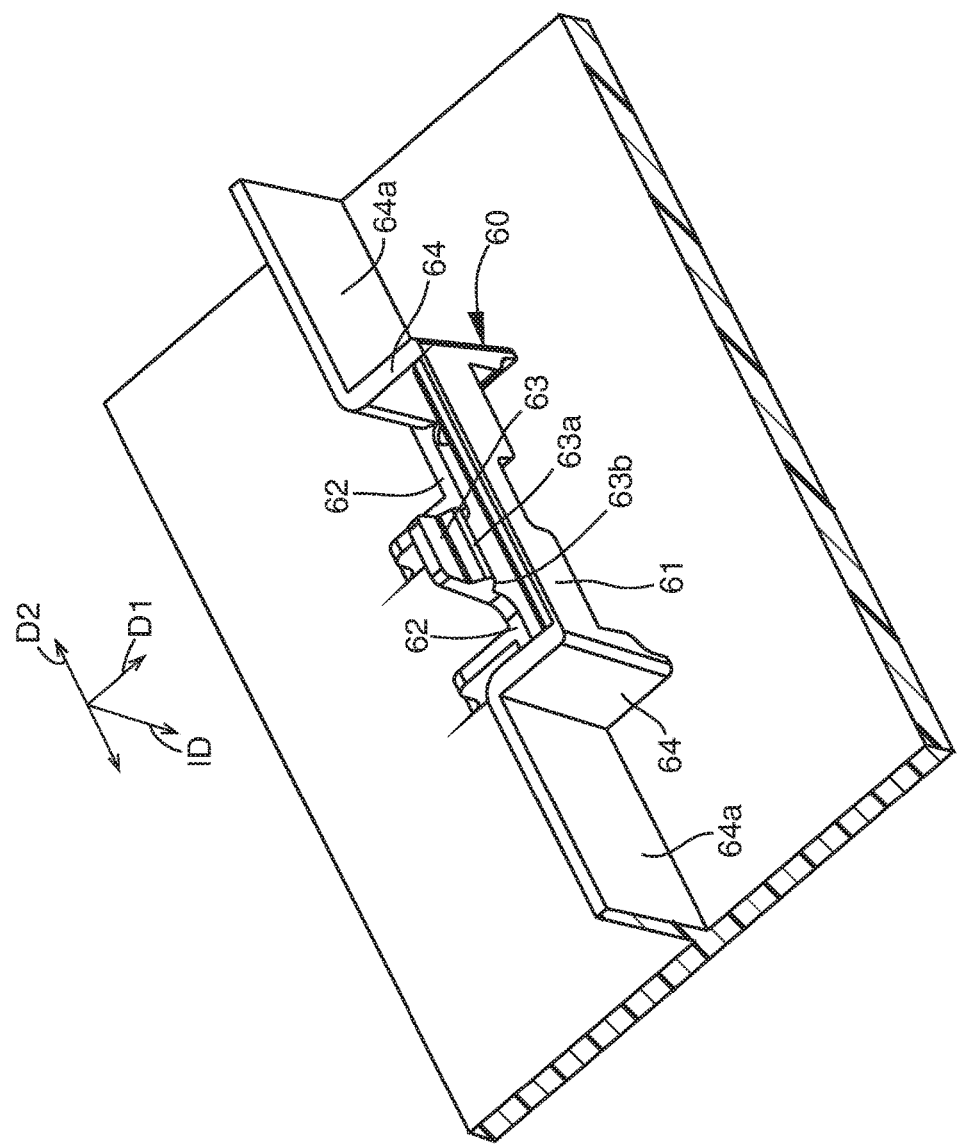
FIG. 10 is a partial, enlarged perspective view of the outer panel and the coupling female of the door apparatus of a box according to the embodiment of the present invention, where the coupling is provided at the intermediate portion of the door apparatus.

As illustrated in FIGS. 8(a)-8(c), the extending portion 63 is provided at the back surface 30c of the outer panel 30 or at the stopper 62. The extending portion 63 extends in a direction opposite the inserting direction ID from the outer panel 30 or the stopper 62 toward the inner panel 20. The extending portion 63 extends through the opening 52b1 of the coupling male 50. A tip of the extending portion 63 is a free end. The extending portion 63 is elastically deformable using its resin elasticity in a direction perpendicular to the inserting direction ID. The elastically deforming direction of the extending portion 63 may be the same direction as an elastically deforming direction of the engaged beam 61 (i.e., the first direction D1 and the direction opposite the first direction D1) or may be a different direction from the elastically deforming direction of the engaged beam 61. When the coupling male 50 is being inserted into the coupling female 60 and the engaging head 51 is engaging with the engaged beam 61, the extending portion 63 is pushed by the coupling male 50 and is elastically deformed in the direction perpendicular to the inserting direction ID, more particularly, in the direction opposite the first direction D1.

As illustrated in FIGS. 8(a)-8(c), the extending portion 63 includes a bulged portion 63a bulging in a direction opposite the elastically deforming direction of the extending portion 63, more particularly, in the direction perpendicular to the inserting direction ID and in the first direction DD. The bulged portion 63a includes an inclined surface 63b inclined such that a bulged amount of the bulged portion 63a is increased in the direction opposite to the inserting direction ID. The inclined surface 63b contacts or engages a cross-sectional corner of an edge of the coupling male 50 defining the opening 52b1 when the engaging head 51 has engaged the engaged beam 61. Since the inclined surface 63b contacts the cross-sectional corner of an edge of the coupling male 50 defining the opening 52b1, when the extending portion 63 elastically returns to its original position, a biasing force acts to the coupling male 50 in the inserting direction ID and in the first direction D1, whereby the coupling male 50 is pressed to the stopper 62.

Figure 16:
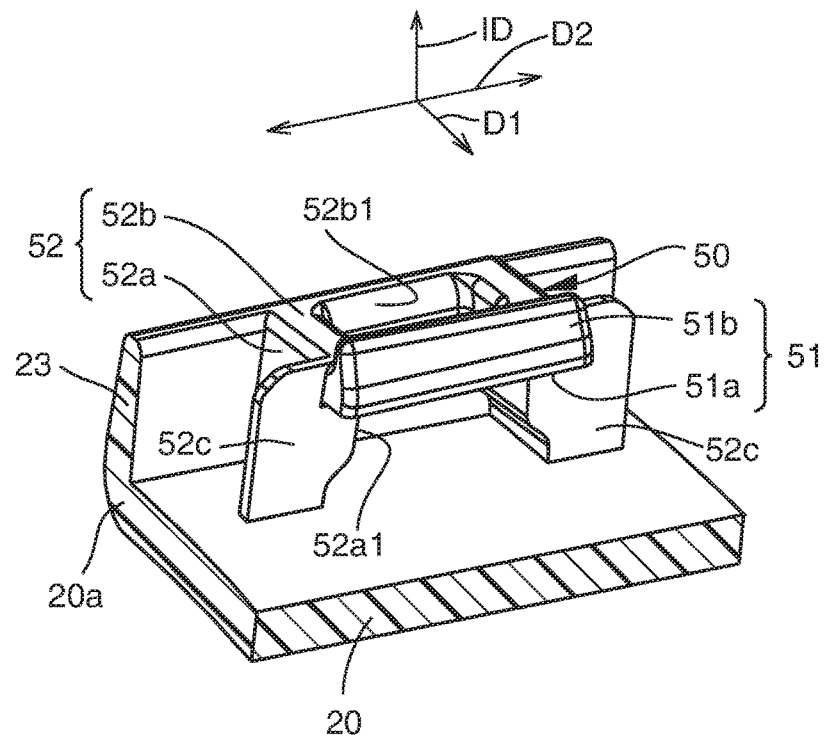
FIG. 16 is a partial, enlarged perspective view of the inner panel and the coupling male of the door apparatus of a box according to a second alteration of the present invention.
Figure 17:
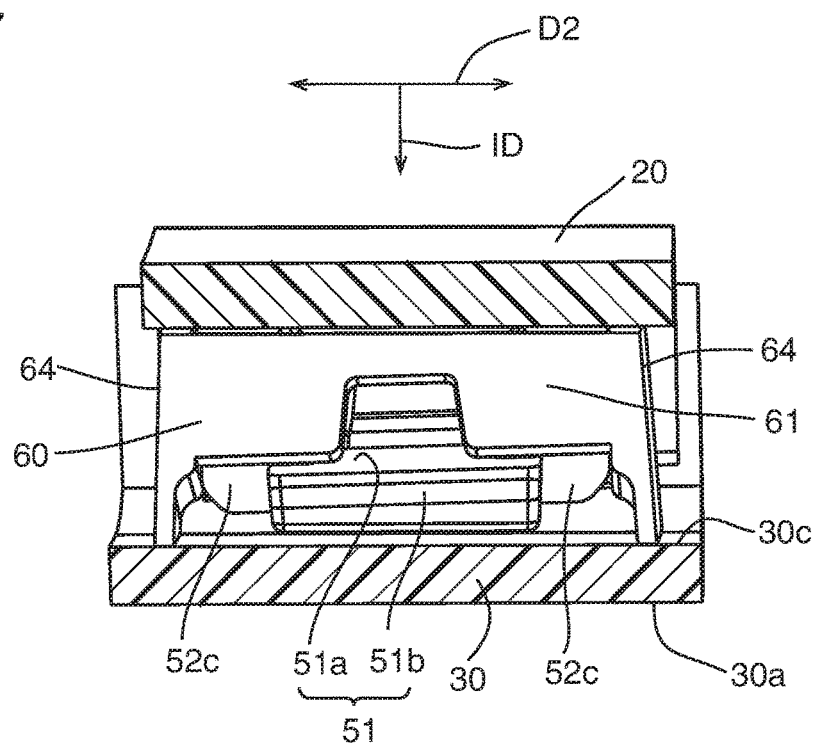
FIG. 17 is a partial, enlarged perspective view of the door apparatus of a box according to the second alteration of the present invention.

As illustrated in FIG. 5, the pair of beam supports 64 protrudes from the back surface 30c of the outer panel 30 toward the inner panel 20. The beam supports 64 oppose to each other in a direction D2 which is perpendicular to the inserting direction ID and to the first direction D1. The head support 52 is located between the opposing beam supports 64, when the coupling male 50 has been coupled with the coupling female 60. As illustrated in FIGS. 16 and 17, a rib 52c protruding from the head support 52 in the direction D2 may be provided in order to suppress the head support 52 from rattling (moving) relative to the pair of beam supports 64 in the direction D2. A pair of ribs 52c may be provided. The ribs 52c are disposed at opposite outside surfaces of the head supports 52 and protrude from the head supports 52 in opposite directions away from each other in the direction D2. It is preferable that the rib 52c contacts the beam support 64 at an end of the rib 52c.

As illustrated in FIG. 5, a support wall rib 64a connected to the beam support 64 and the outer panel 30 may be provided for increasing the strength and the rigidity of the beam support 64. The support wall rib 64b may be connected to the stopper 62, too.

Next, effects and technical advantages of the present invention will be explained. (A) Since the engaged beam 61 is pushed by the engaging head 51 and is elastically deformed in the direction D1 perpendicular to the inserting direction ID of the coupling male 50 into the coupling female 60 when the engaging head 51 is engaging the engaged beam 61, a pair of slits is not required to be provided to the coupling male 50 at opposite sides of the engaging head 51 for causing the engaging head 51 to engage the engaged beam 61. As a result, a length of the coupling male 50 in the inserting direction ID of the coupling male can be made shorter than in a case where the pair of slits are provided at the coupling male 50. As a result, a thickness of the door apparatus (i.e., a thickness of the door apparatus 10 excluding the housing portion 22) can be made thinner than that of the conventional door apparatus.

(B) Since the coupling female 60 includes the stopper 62, the coupling male 50 can be suppressed from further moving relative to the coupling female 60 to a deeper side in the inserting direction ID of the coupling male 50. As a result, the engaging state of the coupling male 50 with the coupling female 60 can be maintained.

(C) Since the bulged portion 63a of the extending portion 63 of the coupling female 60 includes the inclined surface 63b contacting the cross-sectional corner of an edge of the coupling male defining the opening 52b1 of the coupling male 50, a force can be imposed on the coupling male 50 to bias or push the coupling male 50 in the inserting direction of the coupling male. Therefore, the coupling male 50 can be suppressed from moving relative to the coupling female 60 in the direction opposite the inserting direction ID of the coupling male. Further, the coupling male 50 is pressed to the stopper 62 whereby the coupling male 50 can be suppressed from rattling relative to the coupling female 60 in the inserting direction ID.

(D) As illustrated in FIGS. 5 and 6, the coupling female 60 includes the pair of beam supports 64, 64 and the coupling male 50 includes the head support 52. The pair of head supports 52 is located between the paired beam supports 64, 64 of the coupling female 60. As illustrated in FIG. 16, the head supports 52 include the ribs 52c protruding from the head supports 52 away from each other in the second direction D2, the head support 52 of the coupling male 50 can be more suppressed from rattling (moving) relative to the coupling female 60 in the second direction D2 than in a case where the ribs 52c are not provided. As a result, the coupling male 50 can be more suppressed from rattling (moving) relative to the coupling female 60 in the second direction D2.

(E) Since the inner panel 20 includes the flange 23 provided at the periphery 20a of the inner panel 20 and extending toward the outer panel 30 and the outer panel 30 includes the flange-holding portion 32 into which the flange 23 of the inner panel 20 is inserted, the inner panel 20 and the outer panel 30 can be suppressed from moving relative to each other.

Figure 19:
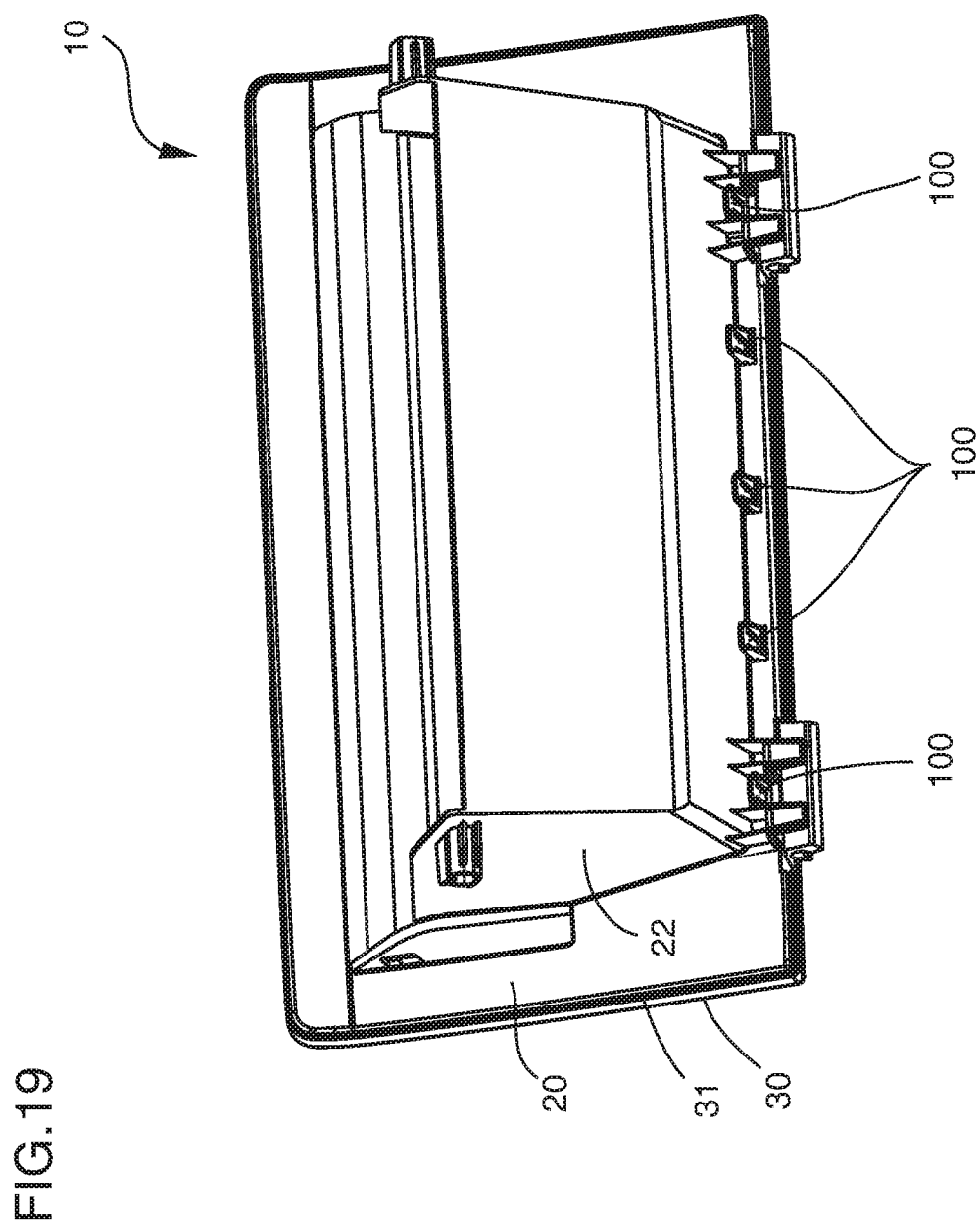
FIG. 19 is a perspective view of the door apparatus of a box according to the embodiment of the present invention, where a known coupling is used for at least one coupling of a plurality of couplings.

In this embodiment of the present invention, the inner panel 20 and the outer panel 30 are coupled with each other by the coupling 40. Since a coupling 40 provided beneath the housing portion 22 is hidden by the housing portion 22, a passenger cannot see the coupling 40 provided beneath the housing portion 22. Therefore, as illustrated in FIGS. 19-21, the coupling 40 provided beneath the housing portion 22 can be replaced by a known coupling 100 which is a coupling of a type (where opposite ends of a lever are supported) different from the cantilever type of the coupling of Japanese Patent Publication 2014-94722.

Figure 20:
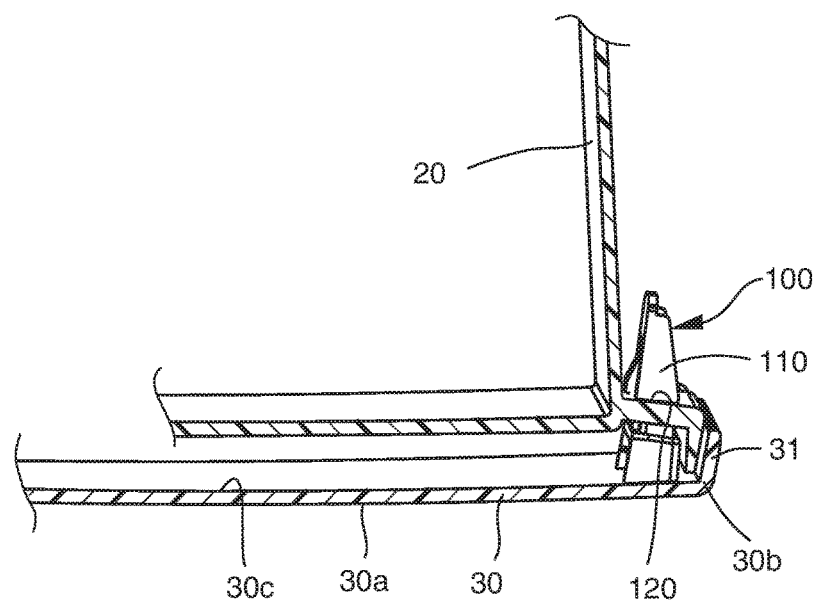
FIG. 20 is a partial, enlarged perspective view of the door apparatus of a box of FIG. 19.
Figure 21:
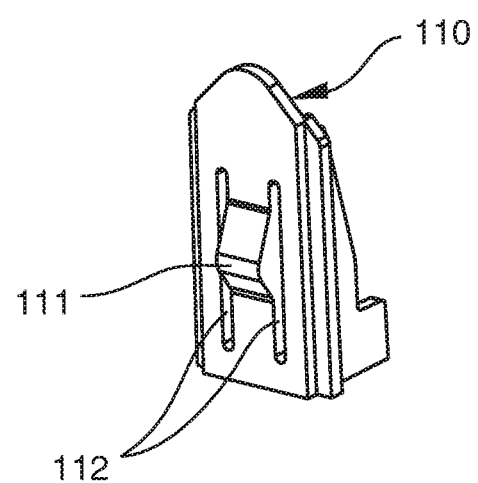
FIG. 21 is enlarged perspective view of the known coupling used in the door apparatus of a box of FIG. 19.
Figure 22:
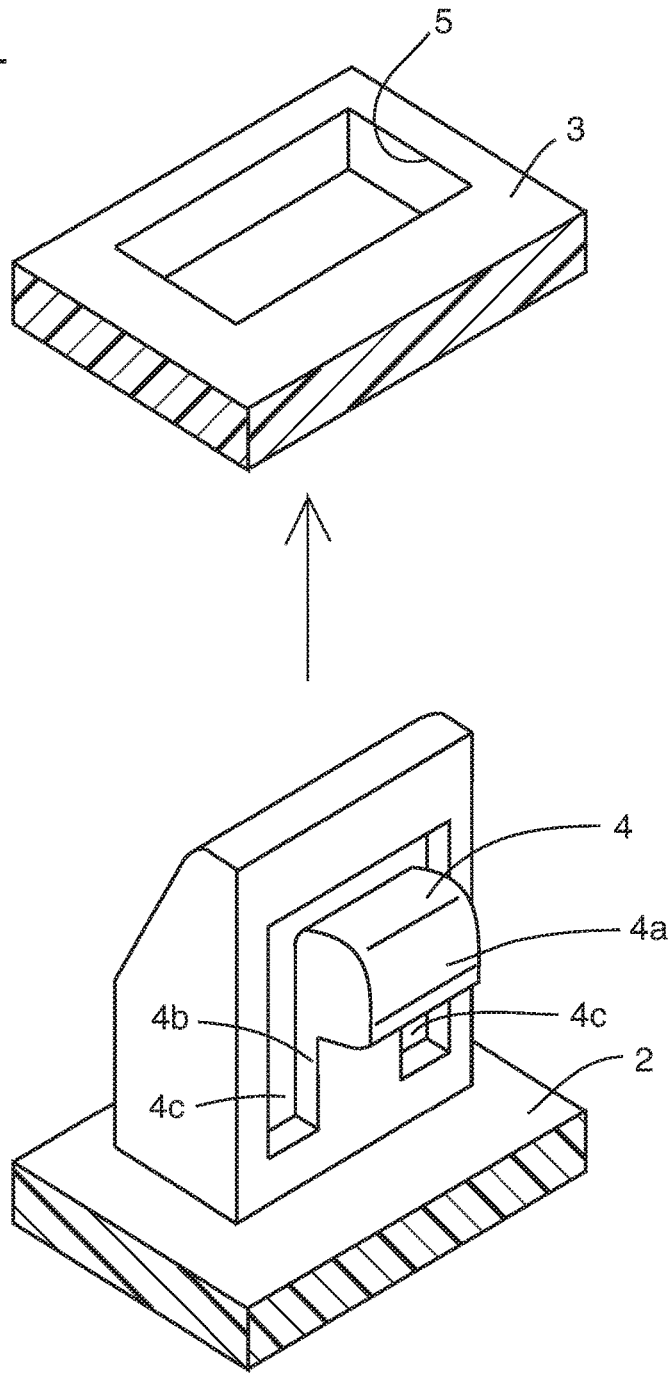
FIG. 22 is a partial perspective view in a disassembly state of parts of a conventional door apparatus of a box.

As illustrated in FIG. 20, the known coupling 100 includes a coupling male 110 formed at the outer panel 30 and a coupling female formed at the inner panel 20. The coupling male 110 rises from the back surface 30c of the outer panel 30 and extends toward the inner panel 20. The coupling female includes an opening 120 formed at the inner panel 20. A length of the coupling male 110 except the housing portion 22 in the rising direction of the coupling male 110 is larger than the thickness of the door apparatus 10. As illustrated in FIG. 21, the coupling male 110 includes an engaging portion 111 and a pair of slits 112. The engaging portion 111 extends in the rising direction of the coupling male 110 and has a bulged portion formed at a central portion of the engaging portion and bulging in a direction perpendicular to the rising direction of the coupling male 110. Each of the pair of slits extends in the rising direction of the coupling male 110 on opposite width-sides of the engaging portion 111. When the engaging portion 111 is inserted into the opening 120 and has passed the opening 120, the bulged portion of the engaging portion 111 engages a cross-sectional corer of an edge of the coupling female defining the opening 120.

What is claimed is:
1. A door apparatus of a box comprising:
an inner panel;
an outer panel; and
a coupling having a coupling male formed at the inner panel and a coupling female formed at the outer panel, wherein
the coupling male includes an engaging head,
the coupling female includes an engaged beam which the engaging head engages,
when the coupling male is inserted into the coupling female, the engaging head engages the engaged beam, whereby the inner panel and the outer panel are coupled with each other so as to be non-removable from each other,
the engaged beam is elastically deformable in a first direction perpendicular to an inserting direction of the coupling male into the coupling female, owing to a structure that the engaged beam extends in a second direction perpendicular to the inserting direction of the coupling male and to the first direction, the engaged beam being elastically deformed in the first direction away from the engaging head by being pushed by the engaging head when the coupling male is inserted into the coupling female, and the engaged beam elastically returning to its original, non-deformed position to engage the engaging head when the engaging head has passed the engaged beam, the coupling male includes an opening penetrating the coupling male in the inserting direction of the coupling male, the coupling female includes an extending portion extending from the outer panel toward the inner panel through the opening, the extending portion includes a bulged portion bulging in the first direction, and the bulged portion includes an inclined surface inclined such that a bulging amount of the bulged portion is increased in a direction opposite the inserting direction of the coupling male, the inclined surface engaging a cross-sectional corner of an edge of the coupling male defining the opening when the engaging head has engaged the engaged beam.

2. The door apparatus of a box according to claim 1, wherein the coupling female includes a stopper restricting the coupling male to further move relative to the coupling female in the inserting direction of the coupling male when the coupling male contacts the stopper.

3. The door apparatus of a box according to claim 1, wherein the coupling female includes a pair of beam supports opposing each other in the second direction and supporting the engaged beam, and the coupling male includes a head support and a rib, the head support supporting the engaging head and being located between the pair of beam supports when the engaging head has engaged the engaged beam, the rib protruding from the head support in an opposing direction of the pair of beam supports.

4. The door apparatus of a box according to claim 1, wherein the inner panel includes a flange disposed at a periphery of the inner panel and extending toward the outer panel, and the outer panel includes a flange-holding portion which holds the flange of the inner panel when the flange of the inner panel is inserted into the flange-holding portion.

5. The door apparatus of a box according to claim 1, wherein the door apparatus of a box is a door apparatus of a glove box of a vehicle.

* * * * *